United States Patent
Noldus et al.

(10) Patent No.: US 8,694,009 B2
(45) Date of Patent: Apr. 8, 2014

(54) CALL ROUTING IN A MOBILE COMMUNICATION SYSTEM

(75) Inventors: Rogier August Caspar Joseph Noldus, BM Goirle (NL); Arvind Sharma, Sauerlach (DE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1009 days.

(21) Appl. No.: 11/915,684

(22) PCT Filed: May 27, 2005

(86) PCT No.: PCT/EP2005/005814
§ 371 (c)(1), (2), (4) Date: Sep. 4, 2008

(87) PCT Pub. No.: WO2006/125459
PCT Pub. Date: Nov. 30, 2006

(65) Prior Publication Data
US 2008/0311905 A1     Dec. 18, 2008

(51) Int. Cl.
*H04W 40/00* (2009.01)
(52) U.S. Cl.
USPC ........ 455/445; 455/433; 455/417; 455/432.1; 455/422.1

(58) Field of Classification Search
USPC .............. 455/433, 445, 417, 461, 432, 432.1, 455/422.1
See application file for complete search history.

(56) References Cited

U.S. PATENT DOCUMENTS

| | | | |
|---|---|---|---|
| 6,002,759 A * | 12/1999 | Kallioniemi et al. ..... | 379/220.01 |
| 6,064,887 A * | 5/2000 | Kallioniemi et al. .......... | 455/445 |
| 7,881,288 B2 * | 2/2011 | Noldus et al. .................. | 370/354 |
| 2002/0052211 A1* | 5/2002 | Kim et al. ...................... | 455/461 |
| 2004/0136376 A1* | 7/2004 | Einamo ........................ | 370/394 |
| 2005/0096022 A1* | 5/2005 | Florkey et al. ................ | 455/415 |
| 2005/0096056 A1* | 5/2005 | Klehn et al. .................. | 455/445 |
| 2005/0113096 A1* | 5/2005 | Gayde et al. ................. | 455/445 |

* cited by examiner

*Primary Examiner* — Khai M Nguyen

(57) ABSTRACT

A method and a system for handling a mobile terminating call in a mobile communications network, wherein interrogation (112) by a first Mobile Switching Center (101) towards a Home Location Register (202) for routing said call is intercepted by an Intercepting Means (104). The Intercepting Means (104) determines that routing said call to a dedicated Mobile Switching Center (105) is required for providing a service for said call. A message (213) comprising routing information for routing said call to the dedicated Mobile Switching Center (105) is sent by the Intercepting Means (104) to the first Mobile Switching Center(101).

20 Claims, 2 Drawing Sheets

CALL ROUTING IN A MOBILE COMMUNICATION SYSTEM

BACKGROUND OF THE INVENTION

1. Technical Field of the Invention

The present invention relates to mobile communications and, more particularly, to a method and a system for handling a mobile terminating call in a mobile communications network, comprising a plurality of Mobile Switching Centres (MLCs).

2. Description of Related Art

In a mobile telecommunications network, such as the Global System for Mobile communications (GSM), a user may roam nationally and even internationally. This has consequences for the architecture of such networks and the manner that calls are routed to mobile terminals. Routing starts as soon as a calling telecommunications subscriber dials the directory number of a called mobile subscriber. The number dialed to reach a mobile subscriber is called the Mobile Subscriber Integrated Services Digital Network (MSISDN). This number includes a Country Code and a National Destination Code, which identifies the subscriber's operator. Furthermore, it includes a subscriber number identifying the subscriber. The MSISDN may also identify the subscriber's Home Location Register (HLR) within the Home Public Land Mobile Network (HPLMN). An HLR is a database that contains information about subscribers to a mobile network. The HLR registers subscribers for a particular service provider. Rather than temporary subscriber data, which is managed by a Visited Location Register (VLR), the HLR stores "permanent" subscriber information including the service profile, and a VLR address associated to the subscriber.

An incoming request for setting up a call to a mobile terminal, in other words setting up a Mobile Terminating (MT) call, is directed to a Gateway Mobile Switching Centre (GMSC) function. The GMSC receiving a request for setting up an MT call determines the Mobile Switching Centre (MSC) that is currently able to reach the called mobile subscriber—in other words, which MSC service area it must connect to. It shall be noted that the GMSC function is distinct from the MSC function, but is usually implemented in an MSC.

For the purpose of determining the appropriate MSC, the GMSC sends a message called Send Routing Information (SRI), which is a Mobile Application Part (MAP) message, to the HLR to request routing information for routing the MT call towards a mobile subscriber. MAP is a protocol, which enables real time communication between nodes in a mobile cellular network. The MAP protocol is also used for the transfer of location information from the VLR to the HLR. In order for the GMSC to be able to interrogate the subscriber's HLR to obtain routing information in this way, the GMSC may address a Signal Transfer Point (STP), which is an element of an SS7-based Intelligent Network that performs routing of the SS7 signalling, and which contains a table linking MSISDNs to their associated HLR.

The HLR informs the GMSC of which MSC to use, and because the called mobile does not have a fixed extension to that particular MSC, the HLR will also provide the GMSC with a temporary routing number, the so-called Mobile Station Roaming Number (MSRN), to be used for signalling. MSRNs are related to the geographical numbering plan, and not assigned to subscribers, nor are they visible to subscribers. After the call is routed to the particular MSC, the International Mobile Subscriber Identity (IMSI) code corresponding to the MSRN is looked up by the particular MSC, and the mobile is paged in its current location area.

In relation to a request for setting up a call, also services may be provided. One way to provide services is by means of an Intelligent Network (IN), which is a modern communications technology, representing an extension of traditional telecommunications architecture, especially that of analog and ISDN networks. IN allows swift and easy introduction of new services.

For roaming subscribers the Customized Applications for Mobile network Enhanced Logic (CAMEL) allows subscribers access to their full portfolio of IN services. CAMEL connects the home and visited mobile networks to various IN platforms used throughout national networks to provide features such as Pre-Paid Calling, Personal Numbering and more complex location dependent services. As a result, CAMEL is a relatively inexpensive method of allowing telecom operators to add new services in to the existing network infrastructure.

CAMEL standard is part of GSM. The main object of CAMEL is to support operator specific services, which are not covered by standardized GSM services to a mobile subscriber, even when the mobile subscriber is roaming outside the HPLMN, i.e. to specify therefore required inter-network interfaces and underlying networks. The CAMEL feature is not a supplementary service, but a network feature to help the network operator. It is, however, also possible to deploy CAMEL for intra-network usage and to use the part of the CAMEL feature being supported by HLR, MSCNLR (Mobile services Switching Centre/Visitor Location Register) and GMSC for invocation of IN based services, which are triggered in a SSF (Service Switching Function) being integrated with the MSC or GMSC, and for routing to stand-alone SSPs (Service Switching Point) and service nodes in the mobile telecommunications system.

For particular groups of CAMEL services, announcements to be played to a subscriber are subscriber-specific. An example of such a CAMEL service is a Personal Greeting Service (PGS). A PGS service may also be based on other protocols such as CS1+. A PGS service plays a customised announcement during call setup. The announcement to be played may (typically) depend on the served subscriber, the calling party or the called party.

WO 98/53626 discloses a method and an arrangement of functional entities in a mobile telecommunications system for supporting, to a mobile subscriber, a second set of operator specific services, having a high level of functionality, additional to services standardised in the system. A first set of operator specific services, with a lower level of functionality, is supposed to already be provided for in the system. The second set of services is provided for by a telecommunications standard different from the standard which provides the first set of services, and is preferably a structured standard for mobile telecommunication. The second set of services is triggered by an IN capability indicator, that is included in a subscription information field stored for each subscriber in a subscriber database.

One such example of a second set of services is specified by CAMEL, which specifies Terminating CAMEL Subscription Information (T-CSI) as the IN trigger information for MT call handling.

If an operator wishes to invoke IN services that use capability that goes beyond the CAMEL capability set, then that operator has to use proprietary IN trigger information elements, hereinafter referred to as IN Trigger Elements. As an example, when the HLR sends an IN Trigger Element to the GMSC, then the GMSC may invoke a vendor specific IN service for the MT call. Using an IN Trigger Element for MT call handling has the requirement that both the GMSC and the HLR are from a single vendor.

Examples of IN services for MT calls, which may be vendor-specific services include
  Personal Greeting Service
  Virtual Private Network.

A special, though not uncommon situation appears when a mobile communications network comprises both GSM and TDMA access technologies. TDMA (Time Division Multiplex Access) comprises a type of multiplexing where two or more channels of information are transmitted over the same link by allocating a different time interval ("slot" or "slice") for the transmission of each channel; that is, the channels take turns to use the link. Some kind of periodic synchronizing signal or distinguishing identifier usually is required so that the receiver can tell which channel is which.

FIG. 3 shows a graphical representation of such a combined GSM & TDMA network. When a call for a subscriber of a combined network arrives, the call needs to be handled by the GSM network or by the TDMA network, depending on the network the called subscriber belongs to. However, the MSISDN (i.e. the called party number) does not indicate which network the call shall be sent to, as explained earlier.

Practically, the following prior art solutions may be used:
  the HLRs in one of the two networks, e.g. the TDMA network, contain the full MSISDN range, encompassing all GSM subscribers and all TDMA subscribers. All calls are routed to that network. When the subscriber belongs to the other network, then the HLR returns a routing number. The GMSC then uses the routing number to route the call to the other network. In the other network, HLR interrogation takes place again;
  all calls are routed to one of the two networks. If the HLR in that network does not hold a record of that number, it rejects the call and the call is then routed to the other network.

The above described prior art solutions have the following disadvantages:
  when an operator has a network with GMSCs from different vendors, then it is not possible to ensure that for selected individual subscribers, the MT call handling is always done by particular GMSCs in that network. MT call handling by a particular GMSC may be needed, amongst others, if vendor-specific IN handling from that GMSC is required;
  additional signalling and additional HLR provisioning are required. In practice, when e.g. a TDMA operator wants to offer GSM as well, that operator would prefer to leave the TDMA network unaffected, but adds just the GSM network. That means, amongst others, that the HLRs in the TDMA network should have no knowledge about the GSM subscribers. These operators typically use a single MSISDN range, with each subscriber being a GSM subscriber or a TDMA subscriber. Hence, the MSISDN of a subscriber of that network does not indicate whether that subscriber is a GSM subscriber or a TDMA subscriber. Using dedicated MSISDN ranges for GSM and TDMA subscribers is not desirable. Such approach would hamper migration between TDMA and GSM (or CDMA and GSM etc.);
  if a vendor specific service needs to be used in a heterogeneous network, with HLRs from multiple vendors and GMSCs from multiple vendors, there is the following dilemma:
    the vendor specific IN Trigger Element may not be administered in HLRs which are not of the same vendor (non-vendor HLRs);
    the vendor specific IN Trigger Element may not be used in GMSCs, which are not of the same vendor (non-vendor GMSC).

As a result, for handling of MT calls it may be desirable for a network to have selected IN subscribers located in a dedicated HLR and to have HLR interrogations for these selected subscribers done by one or more dedicated GMSCs, able to provide an IN service for the call to the subscriber.

However, for a current art GSM network, further disadvantages are:
  any of the MSCs in the network may function as GMSC, so HLR interrogations for a subscriber to an operator specific service may come from both dedicated GMSCs and non dedicated GMSCs;
  a subscriber who wishes to subscribe to an operator specific service, requiring a vendor specific IN Trigger Element, may happen to be located in a non-vendor HLR. An operator cannot easily move subscribers between HLRs, since subscribers' IMSI and MSISDN are tied to the address of the HLR where the subscription data of those subscribers is located.

SUMMARY OF THE INVENTION

The present invention deals with the aforementioned disadvantages by providing a method and a system for handling a mobile terminating call in a mobile communications network, wherein interrogation by a first Mobile Switching Centre towards a Home Location Register for routing said call is intercepted by an Intercepting Means. The Intercepting Means determine that routing said call to a dedicated Mobile Switching Centre is required for providing a service for said call. A message comprising routing information for routing said call to the dedicated Mobile Switching Centre is sent by the Intercepting Means to the first Mobile Switching Centre.

In a first aspect of the invention a method is provided for handling a mobile terminating call in a mobile communications network, comprising a plurality of Mobile Switching Centres, at least one of said Mobile Switching Centres is a dedicated Mobile Switching Centre arranged for providing a service for said call, said method comprising the steps of:
  a. a first Mobile Switching Centre receiving a request for setting up said call;
  b. said first Mobile Switching Centre interrogating a Home Location Register for routing said call;
  characterised in that said method further comprises the steps of:
  c. an Intercepting Means intercepting said interrogation;
  d. said Intercepting Means determining that routing said call to said dedicated Mobile Switching Centre is required for providing said service, and
  e. said Intercepting Means sending a message to said first Mobile Switching Centre, said message comprising routing information for routing said call to said dedicated Mobile Switching Centre.

In this manner a GSM operator with multi-vendor core network, may deploy vendor-specific IN services for Mobile Terminating calls. When a call is established towards a subscriber to whom a vendor-specific IN service applies, the call is automatically routed to an appropriate (dedicated) GMSC from where the HLR interrogation is performed. The present invention is equally applicable in a multi-vendor core network where for certain subscribers MT call handling may be done between a GMSC of vendor A and an HLR of vendor B.

A further embodiment of the invention provides for a method wherein step "d" is performed by interrogating a Home Location Register associated with said call.

A yet further embodiment of the invention provides for a method wherein step "d" is performed by consulting information associated with said call, which information is provided to said Intercepting Means by a mobile telecommunications operator.

Another embodiment of the invention provides for a method wherein said service is an Intelligent Network service such as a Personal Greeting Service (PGS) or a Virtual Private Network (VPN) service.

PGS currently uses CS1+, which is a vendor specific intra-PLMN IN signalling method. Therefore it requires that GMSC and HLR are both from this vendor. VPN is an IN service that deals with Mobile Originating (MO), Mobile Forwarded (MF) and Mobile Terminating (MT) call establishment. For MO and MF call establishment, an operator may use e.g. the Calling Party's Category (CPC) to route a call to an overlay switch (e.g. SSP) from where the VPN service may be invoked. The CPC is sent from HLR to VLR during the Location Update procedure. However, the CPC is not used for MT call handling. The present invention allows for the required overlay routing for MT calls, in a multi-vendor core network, for subscribers that subscribe to e.g. VPN.

A further embodiment of the invention provides for a method wherein in step "e" said routing information comprises a routing number added to an identifier associated to said call. The Routing Number (RN) could be added as a prefix to said identifier, such as the MSISDN.

A still further embodiment of the invention provides for a method wherein in step "c" said routing information comprises an interception indicator, which indicates that said Intercepting Means has intercepted said interrogation.

If the called party number contains an RN in front of the MSISDN; the presence of the RN indicates that the call was already re-routed as a result of Mobile Number Portability. The RN in front of the MSISDN contains a further interception indication (i.e. the RN has an additional digit) of the required GMSC for this call; the further digit in the RN indicates that the call was already re-routed as a result of GMSC selection. There will be no need to intercept this call in a later stage, thus reducing signalling overhead.

A yet further embodiment of the invention provides for a method that further comprises the step of said first Mobile Switching Centre routing said call to said dedicated Mobile Switching Centre, based on said routing information.

In a second aspect of the invention a system is provided for handling a mobile terminating call in a mobile communications network, comprising a plurality of Mobile Switching Centres, at least one of said Mobile Switching Centres being a dedicated Mobile Switching Centre arranged for providing a service for said call, the method comprising the steps of:
 a. a first Mobile Switching Centre arranged for receiving a request for setting up said call;
 b. said first Mobile Switching Centre arranged for interrogating a Home Location Register for routing said call, characterised in that said system further comprises:
 c. an Intercepting Means, arranged for intercepting said interrogation;
 d. said Intercepting Means being arranged for determining that routing said call to said dedicated Mobile Switching Centre is required for providing said service;
 e. said Intercepting Means being arranged for sending a message to said first Mobile Switching Centre, said message comprising routing information for routing said call to said dedicated Mobile Switching Centre;

A further embodiment of the invention provides for a system wherein said Intercepting Means is a Mobile Number Portability Signalling Relay Function.

In the case that a subscriber has moved from a first operator to a second operator, the first operator may apply Mobile Number Portability (MNP). The subscriber's subscription data are in this case located in one of the HLRs of the second operator. As a result, the link MSISDN-HLR Address is no longer guaranteed. It is no longer possible to identify the HLR where that subscriber's subscription data is located by deriving the address from the called subscriber's MSISDN. Hence, when the GMSC sends MAP SRI for this call, the MAP SRI needs to be diverted to a HLR of the second operator. An MNP Signalling Relay Function (SRF) is used to intercept the interrogation of the HLR by the MSC. The present invention proposes to use the functionality of an MNP SRF to also provide the first MSC with routing information for routing the call to the dedicated MSC. In this way additional signalling is further reduced in an efficient way.

An example of additional functionality of an MNP SRF by adding a routing number is provided in table 1:

TABLE 1

| Entry number | IMSI | MSISDN | HLR Address | Portability Status | Required GMSC | RN |
|---|---|---|---|---|---|---|
| 1 | <IMSI #1> | <MSISDN #1> | SPC #1 | Not ported | | |
| 2 | <IMSI #2> | <MSISDN #2> | SPC #2 | Not ported | | |
| 3 | <IMSI #3> | <MSISDN #3> | | Ported to PLMN-B | | "122" |
| 4 | <IMSI #4> | <MSISDN #4> | | Ported to PLMN-C | | "123" |
| 5 | <IMSI #5> | <MSISDN #5> | SPC #3 | Not ported | <GMSC Address> | "1211" |
| 6 | <IMSI #6> | <MSISDN #6> | SPC #4 | Not ported | <GMSC Address> | "1211" |

Clarification for table 1

Entry 1: This subscriber is not ported and has her subscription data located in the HLR indicated by SPC #1. For this subscriber, there is no requirement that MT call interrogation is done from a particular GMSC. Hence, there is no GMSC Address or RN defined for this subscriber.
Entry 2: This subscriber is not ported and has her subscription data located in the HLR indicated by SPC #2.
Entry 3: This subscriber is ported to PLMN-B. The RN for routing the call to PLMN-B is "122". The HLR Address for this subscriber is defined in the recipient network for that subscriber; hence the HLR Address field is empty. Likewise, the GMSC Address is empty.
Entry 4: This subscriber is ported to PLMN-C. The RN for routing the call to PLMN-C is "123".
Entry 5: This subscriber is not ported and has her subscription data located in the HLR indicated by SPC #3. For this subscriber, there is the requirement that MT call interrogation is done from a particular GMSC. Hence, the GMSC Address is defined, to indicate the required GMSC; this GMSC Address may be an Address Range, as opposed to a single Address. The GMSCs from a particular vendor may be grouped in an Address range.
The RN that is needed to route calls to one of the required GMSCs is "1211".
Entry 6: This subscriber is not ported and has her subscription data located in the HLR indicated by SPC #4. For this subscriber, there is the requirement that MT call interrogation is done from a particular GMSC.

Another embodiment of the invention provides for a system wherein said Intercepting Means is a Flexible Number Register. Flexible Number Register (FNR) is an implementation of the MNP SRF.

A yet further embodiment of the invention provides for a system wherein said first Mobile Switching Centre is a Gateway Mobile Switching Centre.

A further embodiment of the invention provides for a system wherein said dedicated Mobile Switching Centre is a Gateway Mobile Switching Centre.

Another embodiment of the invention provides for a system wherein said first Mobile Switching Centre is associated to a wireless access network being different from a wireless access network associated to said dedicated Mobile Switching Centre.

An advantage of this embodiment is efficient call routing in multi-access technology mobile networks, consisting of e.g. both GSM infrastructure and TDMA infrastructure, with a single MSISDN range.

A yet further embodiment of the invention provides for a system wherein said first Mobile Switching Centre is arranged for routing said call to said dedicated Mobile Switching Centre, based on said routing information.

In a third aspect of the invention an Intercepting Means is provided for operating in the system according to the second aspect of the invention.

In a fourth aspect of the invention a computer program is provided, comprising program instructions for causing a computer to perform the method according to the first aspect of the present invention.

Provided in a fifth aspect of the invention is a computer program on a carrier and comprising computer executable instructions for causing a computer to perform the method according to the first aspect of the present invention.

A further embodiment provides for a computer program, wherein said carrier is a record medium, computer memory, read-only memory or an electrical carrier signal.

DETAILED DESCRIPTION OF THE INVENTION

By means of description of the illustrative embodiments the invention will be explained in more detail.

Figure 1:
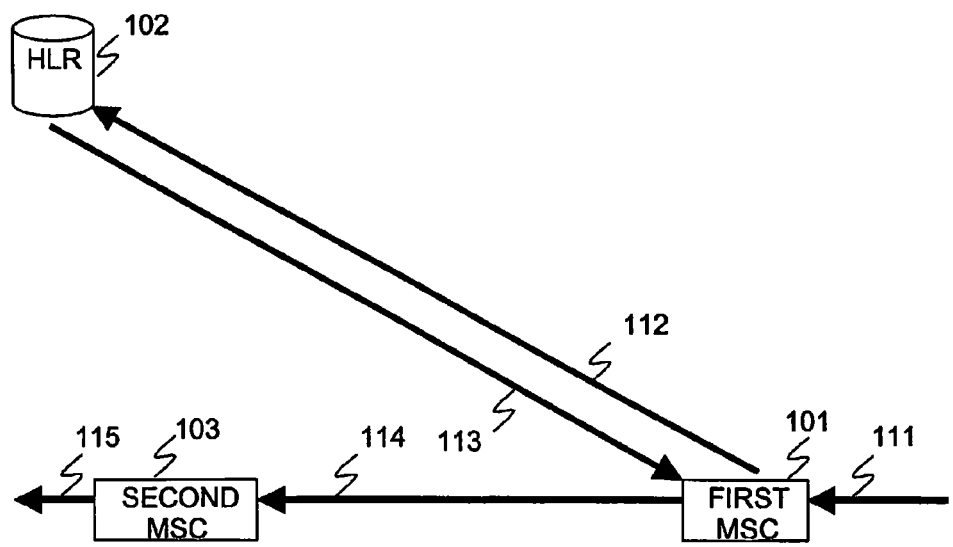
FIG. 1 shows a graphical representation of an interrogation of a HLR by a first MSC for routing a Mobile Terminating call according to the current state of the art.

FIG. 1 shows a simplified graphical representation of an interrogation of a HLR by a first MSC for routing a Mobile Terminating call according to the current state of the art.

The following steps occur:

Step 111 A Mobile Terminating (MT) call, identified by MSISDN, arrives at a first MSC 101 in the HPLMN. The MSC 101 may be a GMSC.

Step 112 The first MSC 101 interrogates HLR 102, which is associated to the MT call, by sending SRI towards HLR 102.

Step 113 The HLR 102 returns a Routing Number (RN) to the first MSC 101 for routing the MT call to a second MSC 103, which may be a GMSC.

Step 114 The first MSC 101 uses the RN to route the call to the second MSC 103.

Step 115 The second MSC 103 further routes the call.

Figure 2:
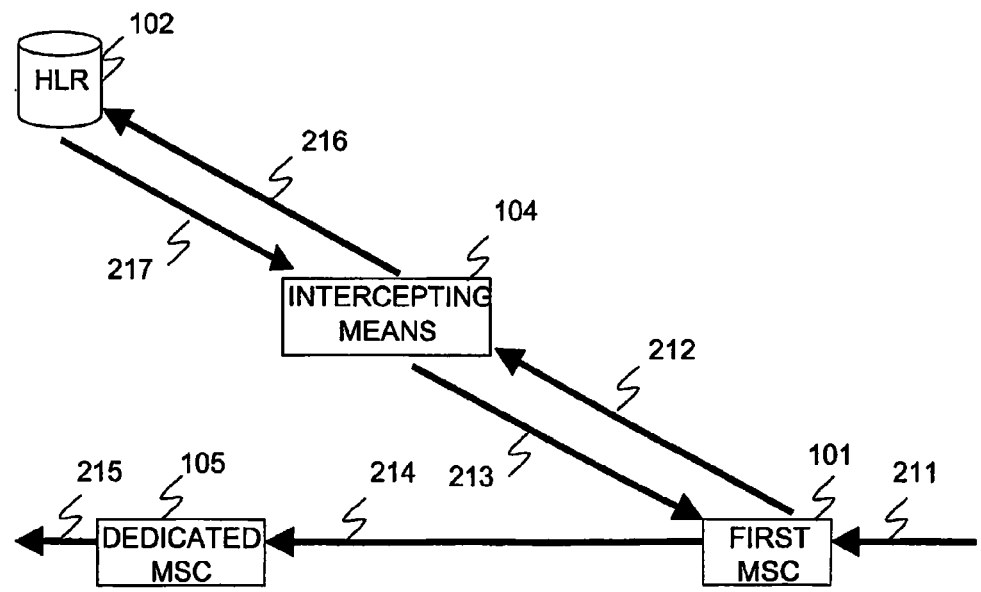
FIG. 2 shows a graphical representation of the present invention.

FIG. 2 provides a general graphical representation of the present invention.

The following steps occur:

Step 211 A Mobile Terminating (MT) call, identified by MSISDN, arrives at a first MSC 101 in the HPLMN. The MSC 101 may be a GMSC.

Step 212 The first MSC 101 interrogates HLR 102, which is associated to the MT call, by sending SRI towards HLR 102. Intercepting Means 104, however, intercept the SRI. The Intercepting Means 104 consult information associated with said call. In this case, suppose the information points out that the MT call should be routed to a dedicated MSC 105 capable of providing a service for this MT call. The information may be provided to said Intercepting Means 104 by a mobile telecommunications operator, or the Intercepting Means may have interrogated 216, 217 the HLR 102 for this information.

Step 213 The Intercepting Means 104 returns in a message, the routing information by means of an RN to the first MSC 101.

Step 214 The first MSC 101 uses the RN to route the call to the dedicated MSC 105.

Step 215 The dedicated MSC 105 further routes the call for providing a requested service.

Figure 3:
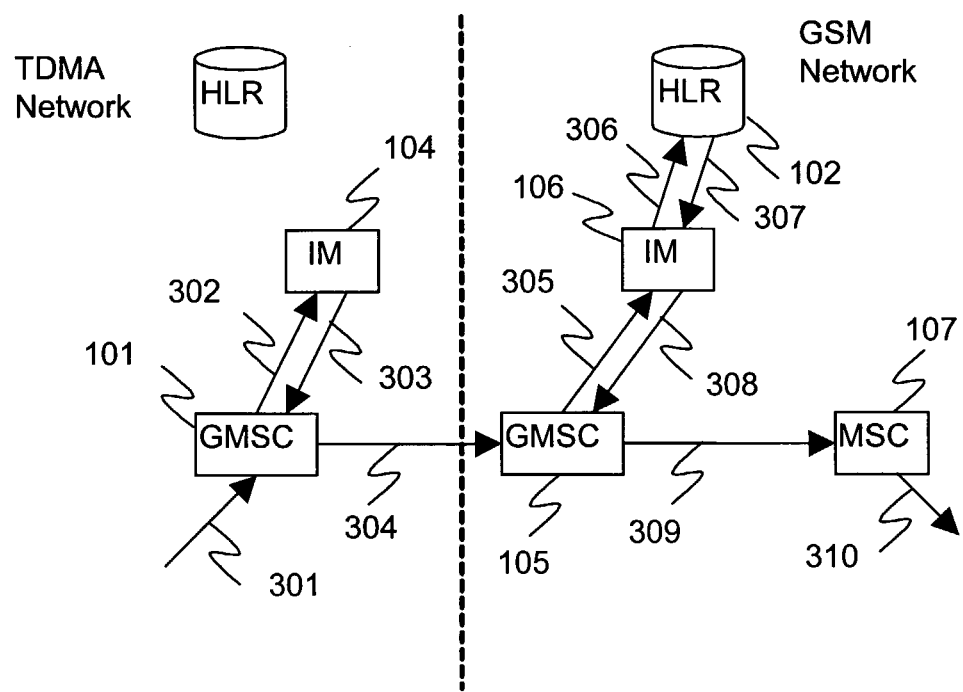
FIG. 3 shows an example of a call flow in a combined GSM-TDMA network according to the present invention.

FIG. 3 shows an example of a call flow in a combined GSM-TDMA network.

In this example next steps occur:

Step 301 A call is established in the TDMA network and the call is destined for a GSM subscriber from this operator.

Step 302 The TDMA GMSC 101 sends MAP SRI to obtain routing information for this call.

Step 303 The Intercepting Means (IM) 104 intercepts the MAP SRI. The subscriber is marked as "GSM subscriber" in the Intercepting Means (which may be an FNR). Since the interrogating GMSC belongs to the TDMA network, the Intercepting Means returns a routing number to the GMSC.

Step 304 The TDMA GMSC 101 routes the call to the GSM network.

Step 305 The GMSC 105 in the GSM network sends MAP SRI to obtain routing information for this call.

Step 306 The Intercepting Means 106 intercepts the MAP SRI. The subscriber is marked as "GSM subscriber" in the Intercepting Means 106. Since the interrogating GMSC belongs to the GSM network, the Intercepting Means 106 forwards the MAP SRI to the HLR 102 for this subscriber.

Steps 307-310 The HLR 102 returns routing information for this call and the call is delivered to the called subscriber through MSC 107.

The use of an Intercepting Means such as an FNR for the purpose of network selection, as described in the present section, is equal to the use of the interception means for the purpose of (G)MSC selection, as described in earlier sections.

The present section takes a combined GSM-TDMA network as example. The principle also applies to e.g. combined GSM-CDMA network or other combinations.

When the individual networks are multi-vendor, then the RN that is provisioned in the Intercepting Means may be used to select the network for this call (e.g. GSM network) and may be used at the same time to select the (G)MSC that shall be used in the GSM network.

What is claimed is:

1. A method for handling a mobile terminating call in a mobile communications network having a plurality of Mobile Switching Centres, wherein a first Mobile Switching Centre receives a request for setting up the call and sends a Mobile Application Part (MAP) Send Routing information (SRI) message toward a Home Location Register (HLR) to obtain routing information for the call, and another of the Mobile Switching Centres, different from the first Mobile Switching Centre, is a dedicated Mobile Switching Centre arranged for providing a service for said call, said method comprising the steps of:

an Intercepting Means intercepting the MAP SRI message sent from the first Mobile Switching Centre to the HLR, thereby preventing the MAP SRI from reaching the HLR;

said Intercepting Means determining from call-associated information associated with the call that routing said call to said dedicated Mobile Switching Centre is required for providing said service; and said Intercepting Means sending a routing message to said first Mobile Switching Centre, said routing message comprising routing information for routing said call to said dedicated Mobile Switching Centre.

2. The method according to claim 1, further comprising, prior to the Intercepting Means intercepting the MAP SRI, the step of the Intercepting Means obtaining the call-associated information from the HLR.

3. The method according to claim 1, further comprising, the step of the Intercepting Means obtaining the call-associated information from a mobile telecommunications operator.

4. The method according to claim 1, wherein said service is an Intelligent Network service selected from a Personal Greeting Service and a Virtual Private Network service.

5. The method according to claim 1, wherein the step of sending a message comprising routing information to the first Mobile Switching Centre includes sending routing information that comprises a routing number added to an identifier associated with said call.

6. The method according to claim 1, wherein the step of sending a message comprising routing information to the first Mobile Switching Centre includes sending routing information that comprises an interception indicator, which indicates that said Intercepting Means has intercepted said interrogation.

7. The method according to claim 1, further comprising the step of said first Mobile Switching Centre routing said call to said dedicated Mobile Switching Centre, based on said routing information.

8. system for handling a mobile terminating call in a mobile communications network having a plurality of Mobile Switching Centres, wherein a first Mobile Switching Centre receives a request for setting up the call and sends a Mobile Application Part (MAP) Send Routing information (SRI) message toward a Home Location Register (HLR) to obtain routing information for the call, and another of the Mobile Switching Centres, different from the first Mobile Switching Centre, is a dedicated Mobile Switching Centre arranged for providing a service for said call, the system comprising:

an Intercepting Means for intercepting the MAP SRI message sent from the first Mobile Switching Centre to the HLR, thereby preventing the MAP SRI from reaching the HLR, wherein the Intercepting Means is configured to:

determine that routing said call to said dedicated Mobile Switching Centre is required for providing said service, and send a routing message to said first Mobile Switching Centre, said routing message comprising routing information for routing said call to said dedicated Mobile Switching Centre.

9. The system according to claim 8, wherein said Intercepting Means is a Mobile Number Portability Signal Relay Function.

10. The system according to claim 8, wherein said Intercepting Means is a Flexible Number Register.

11. The system according to claim 8, wherein said first Mobile Switching Centre is a Gateway Mobile Switching Centre.

12. The system according to claim 8, wherein said dedicated Mobile Switching Centre is a Gateway Mobile Switching Centre.

13. The system according to claim 8, wherein said first Mobile Switching Centre is associated with a wireless access network.

14. The system according to claim 8, wherein said first Mobile Switching Centre is arranged to route said call to said dedicated Mobile Switching Centre, based on said routing information.

15. An intercepting means for operating in a mobile communications network handling a mobile terminating call, the network comprising a plurality of Mobile Switching Centers, wherein a first Mobile Switching Centre receives a request for setting up the call and sends a Mobile Application Part (MAP) Send Routing Information (SRI) message toward a Home Location Register (HLR) to obtain routing information for the call, and another of the Mobile Switching Centres, different from the first Mobile Switching Centre, is a dedicated Mobile Switching Centre arranged for providing a service for said call, wherein the intercepting means is configured to:

intercept the MAP SRI message sent from the first Mobile Switching Centre to the HLR, thereby preventing the MAP SRI from reaching the HLR;

determine that routing said mobile terminating call to said dedicated Mobile Switching Centre is required for providing said service; and send a routing message to said first Mobile Switching Centre, said routing message comprising routing information for routing said call to said dedicated Mobile Switching Centre.

16. The intercepting means according to claim 15, said intercepting means comprising a Mobile Number Portability Signal Relay Function.

17. The intercepting means according to claim 15, said intercepting means comprising a Flexible Number Register.

18. The intercepting means according to claim 15, wherein the intercepting means is configured to intercept the MAP SRI from a Gateway Mobile Switching Centre.

19. The intercepting means according to claim 15, wherein the intercepting means is configured to send the routing message to the first Mobile Switching Centre providing routing information to route the call to a Gateway Mobile Switching Centre.

20. The intercepting means according to claim 15, wherein the intercepting means is configured to determine, without sending the MAP SRI to the HLR, that routing the mobile terminating call to the dedicated Mobile Switching Centre is required by consulting call-associated information associated with the call, wherein the intercepting means obtains the call-associated information from one of:

the HLR prior to the Intercepting Means intercepting the MAP SRI; and a mobile telecommunication operator.

\* \* \* \* \*